US012302910B2

(12) United States Patent
Sun et al.

(10) Patent No.: US 12,302,910 B2
(45) Date of Patent: May 20, 2025

(54) COOKING APPLIANCE

(71) Applicant: KONINKLIJKE PHILIPS N.V., Eindhoven (NL)

(72) Inventors: Wen Sun, Shanghai (CN); Yun Chen, Shanghai (CN); Guangming Su, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 177 days.

(21) Appl. No.: 16/611,278

(22) PCT Filed: May 13, 2018

(86) PCT No.: PCT/EP2018/062279
§ 371 (c)(1),
(2) Date: Nov. 6, 2019

(87) PCT Pub. No.: WO2018/206810
PCT Pub. Date: Nov. 15, 2018

(65) Prior Publication Data
US 2020/0054024 A1    Feb. 20, 2020

(30) Foreign Application Priority Data

May 12, 2017  (WO) ................ PCT/CN2017/000352
Jun. 20, 2017  (EP) .................................... 17176844

(51) Int. Cl.
*A21B 1/24*    (2006.01)
*A21B 3/04*    (2006.01)
(Continued)

(52) U.S. Cl.
CPC ................ *A21B 1/245* (2013.01); *A21B 3/04* (2013.01); *A47J 36/321* (2018.08);
(Continued)

(58) Field of Classification Search
CPC ......................................................... F24D 1/06
See application file for complete search history.

(56) References Cited

U.S. PATENT DOCUMENTS 4,563,945 A * 1/1986 Hwang .................... A21B 3/04
99/477
5,560,952 A  10/1996 Miller et al.
(Continued)

FOREIGN PATENT DOCUMENTS

CN          1926386 A      3/2007
CN          104510323      4/2015
(Continued)

OTHER PUBLICATIONS

International Search Report and Written Opinion dated Jul. 6, 2018 for International Application No. PCT/EP2018/062279 Filed May 13, 2018.

*Primary Examiner* — Elizabeth M Kerr
(74) *Attorney, Agent, or Firm* — Schott, P.C.

(57) ABSTRACT

A cooking appliance (100) is disclosed comprising a cooking chamber (170), a heating stage (150) for heating a food product within the cooking chamber and a humidity adjustment stage (160) for adjusting the humidity within the cooking chamber. The cooking appliance further comprises a user interface (110) configured to allow a user to specify a texture of said food product and a degree of browning of said food product; and a controller (120) responsive to the user interface and configured to control the heating stage and the humidity adjustment stage in accordance with an algorithm having the user-specified texture of said food product and the user-specified degree of browning of said food product as parameters.

18 Claims, 3 Drawing Sheets

(51) Int. Cl.
  *A47J 36/32* (2006.01)
  *F24C 7/08* (2006.01)
  *F24C 15/32* (2006.01)

(52) U.S. Cl.
  CPC ........... *A47J 2202/00* (2013.01); *F24C 7/085* (2013.01); *F24C 15/327* (2013.01)

(56) References Cited

U.S. PATENT DOCUMENTS

| | | | |
|---|---|---|---|
| 6,635,854 B1* | 10/2003 | Shelton | F24C 15/003 219/486 |
| 2006/0251785 A1* | 11/2006 | Fraccon | A21B 1/14 426/510 |
| 2009/0133684 A1* | 5/2009 | Embury | F24C 15/327 126/20 |
| 2010/0178395 A1* | 7/2010 | Embury | A23L 5/13 426/231 |
| 2012/0199110 A1* | 8/2012 | Shaffer | F24C 15/327 126/1 R |
| 2012/0321760 A1 | 12/2012 | Xie | |
| 2013/0092145 A1 | 4/2013 | Murphy | |
| 2013/0092680 A1* | 4/2013 | Cartwright | H05B 6/687 219/622 |
| 2014/0364971 A1 | 12/2014 | Minvielle | |
| 2015/0330640 A1* | 11/2015 | Stork genannt Wersborg | A21B 1/40 99/332 |
| 2016/0061490 A1* | 3/2016 | Cho | F24H 1/122 219/400 |
| 2016/0220064 A1* | 8/2016 | Young | A47J 36/00 |
| 2016/0327279 A1* | 11/2016 | Bhogal | F24C 15/008 |
| 2016/0353921 A1 | 12/2016 | Dodge | |
| 2016/0360577 A1* | 12/2016 | Mineoka | F24C 15/327 |
| 2018/0045421 A1* | 2/2018 | Bailie | A21B 1/245 |
| 2019/0203944 A1* | 7/2019 | Cho | F24C 15/003 |

FOREIGN PATENT DOCUMENTS

| | | |
|---|---|---|
| CN | 104665573 A | 6/2015 |
| CN | 107466219 A | 12/2017 |
| EP | 2881669 | 6/2015 |
| JP | 09145066 A * | 6/1997 |
| JP | H09-145066 A | 6/1997 |
| JP | 2667667 B2 | 10/1997 |
| JP | 2006-292189 A | 10/2006 |
| WO | 2014020872 A1 | 2/2014 |

\* cited by examiner

100

COOKING APPLIANCE

CROSS REFERENCE TO RELATED APPLICATIONS

This application is the U.S. National Phase application under 35 U.S.C. § 371 of International Application No. PCT/EP2018/062279 filed May 13, 2018, published as WO 2018/206810 on Nov. 15, 2018, which claims the benefit of European Patent Application Number 17176844.3 filed Jun. 20, 2017 and Patent Application Number PCT/CN2017/000352 filed May 12, 2017. These applications are hereby incorporated by reference herein.

FIELD OF THE INVENTION

The present invention relates to a cooking appliance comprising a cooking chamber, a heating stage for heating a food product within the cooking chamber and a user interface for controlling the cooking appliance.

BACKGROUND OF THE INVENTION

In food cooking, different people typically will have different preferences as to how the food is cooked. In particular, different people typically will have different preferences regarding the texture of the cooked food; whereas some people may like their cooked food to be well done and soft, others may like it less cooked such that the food remains hard or crunchy. This is particularly but not exclusively applies to the cooking of vegetables.

Some existing cooking appliances provide a user with the ability to program the cooking appliance in terms of duration of the cooking process and temperature at which the food product, e.g. a vegetable, is cooked in order to allow the user to control the texture of the food product in this manner. However, this requires the user to have knowledge of the appropriate preparation time of the food product in order to achieve a particular texture, such that inexperienced users will have difficulty to achieve the desired texture because of their lack of knowledge of the appropriate cooking conditions of the food product they wish to cook. Such users may consult a recipe book or a cook book to obtain guidance for the cooking of such food products but such recipes typically do not provide detailed information about how to achieve a particular texture when cooking the food product and instead typically cause the food product to be cooked in an averaged manner such that the inexperienced user has to deploy trial and error techniques to achieve the desired texture during the cooking of the food product in the cooking appliance, which is unsatisfactory.

Other cooking appliances deploy pre-set cooking programmes for particular food products, but such pre-set programmes typically sacrifice flexibility in controlling the texture of the food product, such that even though such cooking appliances may be easier to operate for inexperienced users, the cooked food product may not have the desired texture according to the personal taste of the user.

It is known from US 2013/0092145 A1 to control the degree of browning of a food product through a Maillard reaction or similar food colouration reactions whereby the food product is turned brown via enzymatic or non-enzymatic processes. This US application discloses an oven including a cooking chamber configured to receive a food product, a user interface configured to display information associated with processes employed for cooking, first and second energy sources and a cooking controller. The first energy source provides primary heating and the second energy source provides secondary heating for the food product. The cooking controller may be operably coupled to the first and second energy sources and may include processing circuitry configured to enable an operator to make a browning control selection via the user interface by providing operator instructions to a selected control console rendered at the user interface. The browning control selection may provide control parameters to direct application of heat to the food product via the second energy source. The first energy source may be a RF energy source configured to generate relatively broad-spectrum RF energy to cook a food product placed in the cooking chamber whereas the second energy source may include an air flow generator and an air heater.

U.S. Pat. No. 6,635,854 B1 discloses that an oven includes a food chamber with an access door which houses a water evaporator chamber in fluid communication with the food chamber. By sensing the temperature of the water in the evaporator and the dry bulb temperature within the food chamber and by controlling a dry heat source that heats the air and a wet heat source that heats the water, the cook can control both the final food temperature and the degree of browning of the food.

US 2013/092680 A1 discloses that an oven includes a cooking chamber configured to receive a food product, a user interface configured to display information associated with processes employed for cooking, first and second energy sources, and a cooking controller. The first energy source provides primary heating and the second energy source provides secondary heating for the food product. The cooking controller executes instructions directing application of energy to the food product via the first or second energy sources. The cooking controller may include processing circuitry configured to receive an indication of cooking parameters defining at least a food product category of the food product and select a cooking signature corresponding to the food product category. The cooking signature may include information descriptive of inherent properties of the food product category and input response properties defining one or more sets of instructions associated with a cooking sequence for the food product based on the cooking parameters.

However, as such a browning reaction typically takes place at the surface of the food product, it is not straightforward to control the texture of the food product in this manner.

SUMMARY OF THE INVENTION

The present invention seeks to provide a cooking appliance that can cook a food product such as a vegetable to a desired texture, which desired texture can be specified by a user in a straightforward manner using the user interface of the cooking appliance.

According to an aspect, there is provided a cooking appliance comprising a cooking chamber, a heating stage for heating a food product within the cooking chamber and a humidity adjustment stage for adjusting the humidity within the cooking chamber, the cooking appliance further comprising a user interface configured to allow a user to specify a texture of said food product and a degree of browning of said food product; and a controller responsive to the user interface and configured to control the heating stage and the humidity adjustment stage in accordance with an algorithm having the user-specified texture of said food product and the user-specified degree of browning of said food product as parameters.

The present invention is based on the insight that a food product such as a vegetable can be cooked to a desired texture (e.g. crunchiness, crispness, hardness or firmness) and browning level by controlling the humidity in the cooking chamber during the cooking of the food product. Therefore, by allowing a user to specify the desired texture and browning level of the food product with the user interface and by using these user-specified cooking preferences as parameters in a pre-set algorithm, the cooking appliance can deliver food products prepared to the personal taste of its user in a straightforward manner.

The user interface may be configured to provide the user with a plurality of selection options for each of the texture of the food product and degree of browning of the food product such that the user can select his or her personal preferences in an intuitive manner, thereby providing a particularly user-friendly cooking appliance.

Preferably, the user interface is further configured to allow a user to identify said food product, and wherein said algorithm has the user-specified food product identification as a further parameter. This has the advantage that for different types of food products, e.g. different types of vegetables, the desired degree of browning and a desired texture may be obtained in an optimized manner, as the parameters used in the algorithm are specific to the particular type of food product.

In an embodiment, the user interface is further configured to allow a user to provide feedback regarding a cooking result of said food product, and wherein the controller is further configured to adjust said algorithm in accordance with the user-provided feedback.

This allows the user to indicate a difference between the desired cooking characteristics, i.e. browning level and texture, of a cooked food product and its actual cooking characteristics, which indicated difference is used by the controller to update the algorithm such that the next time the food product is cooked in accordance with the same user-specified parameters, the food product will be cooked more in accordance with the personal preferences of the user of the cooking appliance.

The cooking appliance may further comprise a memory communicatively coupled to the controller, wherein the algorithm is stored in said memory. This makes it possible to update or replace the algorithm, e.g. through a data interface such as a USB port, a network interface, a wireless communication interface, or the like, which may not be possible if the algorithms are hard-coded into the controller.

In an embodiment, the algorithm specifies an operating time of each of the heating stage and the humidity adjustment stage. Typically, the softness of the food product can be increased by exposing the food product to a high humidity heat source at a defined temperature in order to control the degree of browning of the food product, such that the texture of the food can be controlled by the total amount of time the food product is cooked in a high humidity condition.

The cooking appliance may further comprise a temperature sensor in the cooking chamber, wherein the controller is further configured to control at least one of the heating stage and the humidity adjustment stage in response to said temperature sensor. This ensures that the temperature in the cooking chamber is accurately controlled, which assists in ensuring that the food product is cooked according to the user-specified browning level of the food product.

The cooking appliance may further comprise a humidity sensor in the cooking chamber, wherein the controller is further configured to control the humidity adjustment stage in response to said humidity sensor. In this manner, the total duration of the exposure of the food product to a high humidity atmosphere can be accurately controlled, thereby aiding the accurate control of the texture of the food product at the end of the cooking process.

In a preferred embodiment, the heating stage comprises an air heater arranged to blow heated air into the cooking chamber and the humidity adjustment stage comprises a steam generator arranged to expel generated steam into the cooking chamber. Consequently, the cooking appliance comprises a heat source for producing dry heat and a heat source for producing moist heat in order to control the texture of the food product during the cooking process.

The cooking appliance may further comprise an additional heating stage responsive to the controller and coupled between the steam generator and the cooking chamber for superheating the steam generated by the steam generator. This has the advantage that browning reactions at the food product surface may be better controlled. Specifically, in the initial phase of cooking, when the food product surface temperature is below 100° C., the latent heat carried by superheated steam will be released to the food product due to a phase change of water (from steam to liquid). As the food product surface temperature increases, condensation stops and the drying effect of superheated steam starts to work, which will finally result in water loss from the food product surface layer and subsequently browning reactions occur in the later stages of the cooking process of the food product. Consequently, the texture and in particular the surface texture, e.g. crust, of the food product is not adversely affected by the exposure to such a 'moist' heat source such that the food product may be prepared in accordance with a high degree of browning without the browned surface of the food product becoming soggy.

The controller may be further configured to control a speed at which the air heater blows the heated air into the cooking chamber. This for example may be used to accurately control the temperature within the cooking chamber.

In a preferred embodiment, the cooking appliance further comprises a valve arrangement responsive to the controller, the valve arrangement having a first inlet fluidly coupled to the heating stage, a second inlet fluidly coupled to the humidity adjustment stage and an outlet fluidly coupled to the cooking chamber. This allows the controller to switch between the heating stage and the humidity adjustment stage in a straightforward manner. The valve arrangement may be configurable to configure a mixture of heat from the heating stage and humidity from the humidity adjustment stage into the cooking chamber. This allows for the humidity of the heat used to cook the food product in the cooking chamber to be accurately controlled, which further aids the control over the degree of browning and texture of the cooked food product.

The controller may be configured to control a temperature in the cooking chamber such that the temperature is in a range of 120-240° C., preferably in a range of 140-200° C. Such a temperature range is particularly suitable to control the degree of browning and the texture of vegetables, which are a preferred type of food product to be cooked in the cooking appliance.

In at least some embodiments, the cooking appliance comprises an oven although the present invention is not limited to such embodiments of the cooking appliance.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
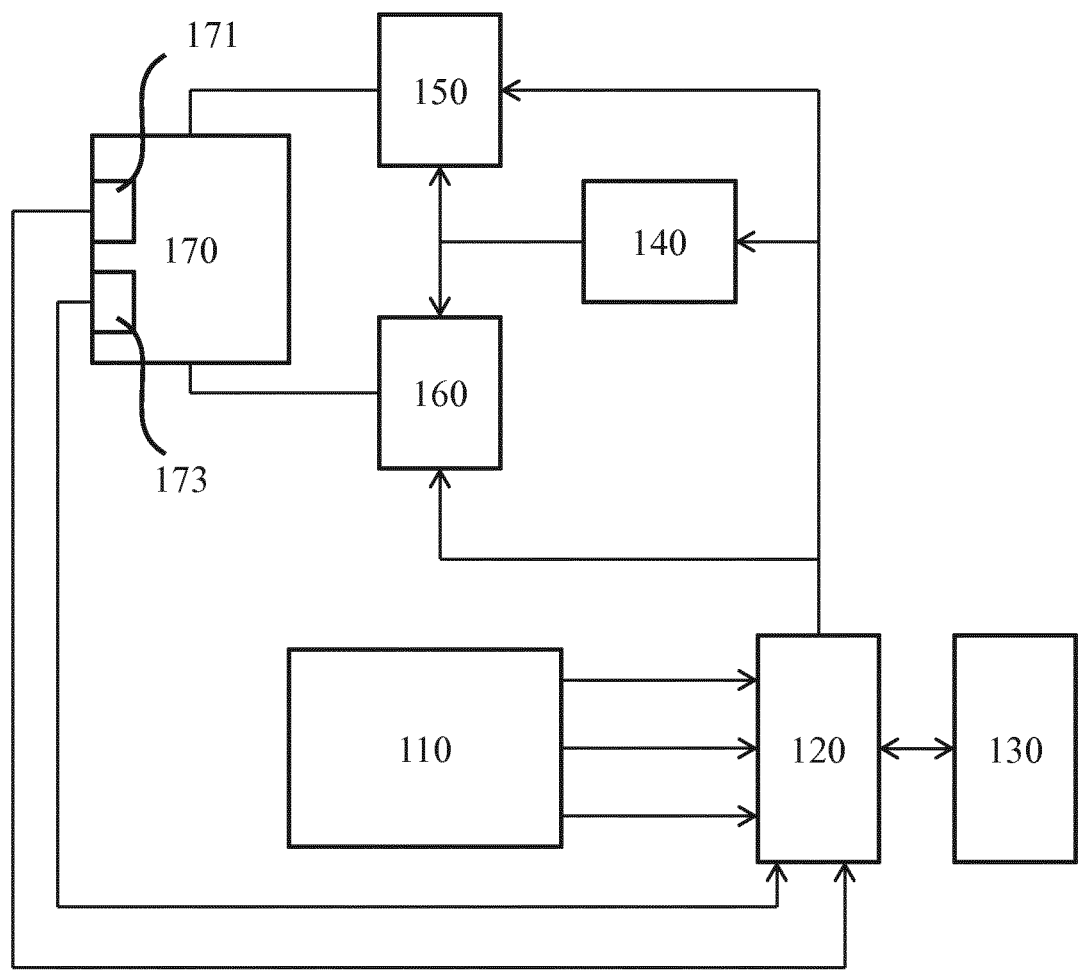
FIG. 1 schematically depicts a block diagram of a cooking appliance according to an embodiment.

It should be understood that the Figs are merely schematic and are not drawn to scale. It should also be understood that the same reference numerals are used throughout the Figs to indicate the same or similar parts.

FIG. 1 schematically depicts a block diagram of a cooking appliance 100 according to an embodiment. The cooking appliance 100 comprises a user interface 110, which user interface may take any suitable form, e.g. comprise at least one of dials, buttons or the like to allow the user to select a plurality of parameters for cooking a particular food product. In an embodiment, the user interface 110 comprises a display, which display may be touch-sensitive such that user inputs may be provided through the display, e.g. in combination with other input devices of the user interface 110. Such user interfaces are well-known per se, and it should be understood that any suitable type of user interface may be used for the user interface 110. In particular, the user interface 110 does not have to be integral to the cooking appliance 100; in some embodiments the user interface 110 is physically separated from the cooking appliance 100 and arranged to communicate with the cooking appliance 100 in wireless fashion, e.g. using a communication protocol such as Wi-Fi, Bluetooth, near-field communication (NFC) or the like. Such a remote user interface 110 may be a dedicated user interface 110 or a user interface function implemented on a mobile communication device, e.g. in the form of a software application on a smart phone, tablet or the like.

Figure 2:
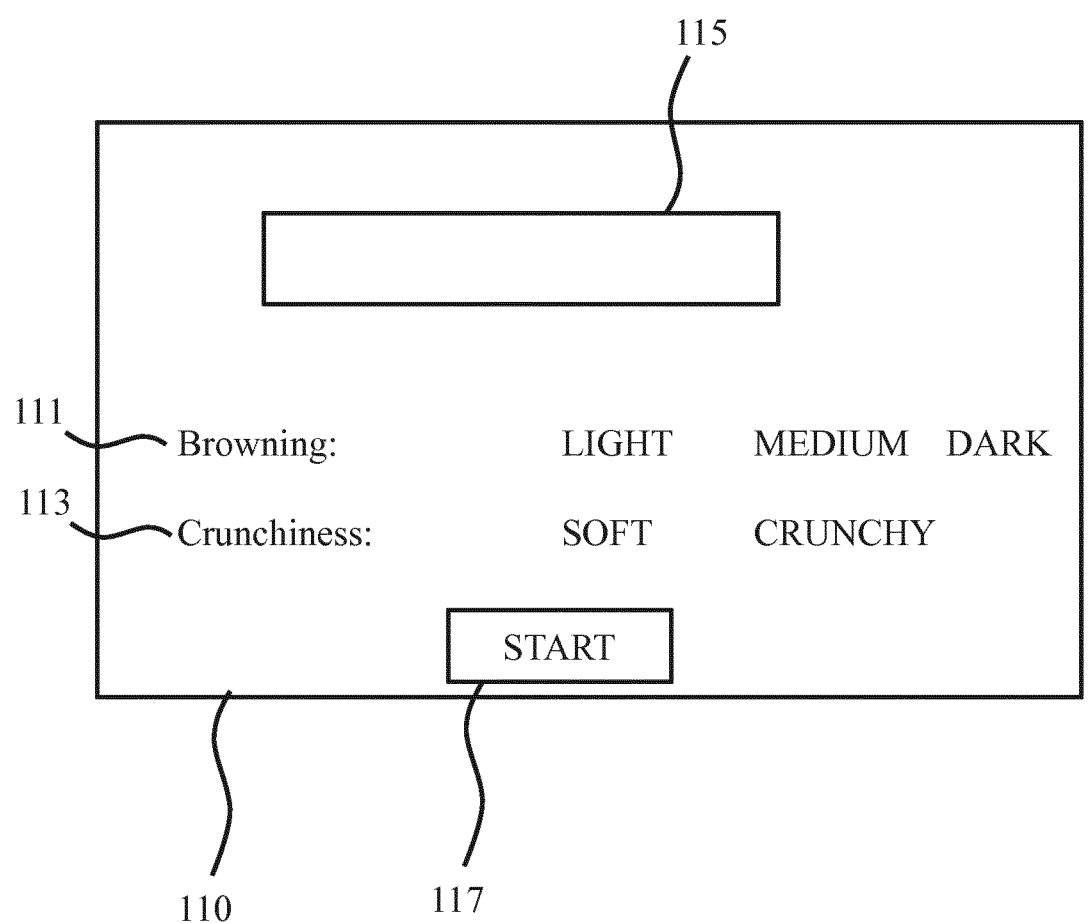
FIG. 2 schematically depicts part of the user interface of a cooking appliance according to an embodiment, and FIG. 3 schematically depicts a block diagram of a cooking appliance according to another embodiment.

The user interface 110 in at least some embodiments offers the user a plurality of selection options to select a desired degree of browning, a desired texture and preferably a food product type for a food product to be cooked in the cooking appliance 100. An example embodiment of such a user interface 110 is schematically depicted in FIG. 2, in which the user interface 110 comprises a first set 111 of choices for the desired degree of browning of a particular food product, which choices are given by way of non-limiting example as "LIGHT", "MEDIUM", and "DARK". The user interface 110 further comprises a second set 113 of choices for the desired texture of the particular food product, which choices are given by way of non-limiting example as "SOFT" and "CRUNCHY" although it should be understood that the sets 111 and 113 of choices may include differently named and/or a different number of such choices. The user interface 110 further comprises a drop-down menu, scroll menu 115 or other type of selection menu of food product types, e.g. vegetable types, which may be used by the user to select the type of food product to be cooked with the cooking appliance 100, e.g. a particular vegetable selected from a list of vegetables for example including broccoli, carrots, aubergine, courgette, and so on.

The user interface 110 may further comprise a start function 117, e.g. a start button or the like, to start the cooking process with the cooking appliance 100 once the user has specified his or her cooking preferences of the food product to be cooked in the cooking appliance. In an embodiment, the user interface 110 is a touchscreen interface such that the user can readily select the desired choices and food product types by touching the user interface 110 in the appropriate areas of the touch screen.

Although not specifically shown, the user interface 110 further may be adapted to allow the user to specify the total weight of the food product to be cooked and the shape of the food product to be cooked, e.g. finely sliced, coarsely sliced, cubed, whole, and so on, as the total weight and shape of the food product typically has a bearing on the total cooking time of the food product in order to prepare (cook) the food product in accordance with the specified user preferences, in particular the degree of browning and the texture of the food product to be cooked.

The user interface 110 is communicatively coupled to a controller 120 arranged to control the cooking appliance 100 in accordance with a pre-set control algorithm in which the user-specified texture and degree of browning of the food product to be cooked are parameters that configure the control algorithm. The control algorithm may further include at least one of user-specified food type of the food product to be cooked, a user-specified total weight of the food product to be cooked and a user-specified shape of the food product to be cooked as further parameters. In an alternative embodiment, the cooking appliance may comprise weighing means in the cooking chamber 170 to weigh the food product to be cooked such that the user does not have to specify the weight of the food product to be cooked.

The pre-set algorithm may be hard-coded into the controller 120. Alternatively, the controller 120 may be communicatively coupled to a data storage device 130, e.g. any suitable type of memory, in which the pre-set algorithm is stored, e.g. in the form of a lookup table from which the controller may retrieve the control parameters for the cooking appliance 100 based on the user-specified information provided through the user interface 110. The controller 120 may be implemented in any suitable manner. The controller 120 may be implemented using one or more dedicated hardware devices, e.g. application-specific integrated circuits, microcontrollers or the like, or may be implemented at least in part in software on a general-purpose processor arrangement within the cooking appliance 100. Other suitable implementations will be immediately apparent to the skilled person in the art.

The cooking appliance 100 further comprises a heating stage 150 and a humidity adjustment stage 160 coupled to a cooking chamber 170. The heating stage 150 may be arranged to force dry heat, e.g. hot air, whilst the humidity adjustment stage 160 may be arranged to force moist heat, e.g. steam or superheated steam, into the cooking chamber 170. The cooking chamber 170 may take any suitable shape, e.g. may be a cooking chamber accessible through a lid or a door of the cooking appliance 100, and may comprise any suitable types of fittings onto which the food product may be placed, e.g. a plurality of opposing tracks into which one or more racks or trays may be fitted, preferably in a horizontal orientation during normal use of the cooking appliance 100.

The heating stage 150 and the humidity adjustment stage 160 are controlled by the controller 120 in accordance with the aforementioned parameterized pre-set algorithm. The controller 120 for example may control the heating stage 150 and the humidity adjustment stage 160 to define a cooking temperature and a humidity level in the cooking chamber 170 in accordance with the parameterized pre-set algorithm. In addition, the cooking appliance 100 may comprise a timer 140, which although shown as a separate entity may form part of the controller 120 in some embodiments, through which the operating time of the heating stage 150 and the humidity adjustment stage 160 can be controlled in accordance with the parameterized pre-set algorithm. This will now be explained in more detail for vegetable food products although it should be understood that the present invention may be used for different types of food products as well.

In a preferred embodiment, the pre-set algorithm can be parameterized by food product type, food product texture and food product browning level. Typically, where a user has specified a more crunchy food product texture, the pre-set algorithm will cause the controller 120 to control the heating stage 150 and the humidity adjustment stage 160 such that mainly dry air is forced into the cooking chamber 170. This for example may be achieved by only enabling the heating stage 150. On the other hand, where the user has specified a softer food product texture, the pre-set algorithm will cause the controller 120 to control the heating stage 150 and the humidity adjustment stage 160 such that a combination of hot air and steam is forced into the cooking chamber 170. This for example may be achieved by only enabling the humidity adjustment stage 160. Alternatively or additionally, the controller 120 may be adapted to configure a mixture of dry heat and moist heat in order to achieve the desired texture of the food product, e.g. an intermediate texture in between crunchy and soft.

The user-specified degree of browning and food product type typically parameterizes the pre-set algorithm to cause the controller 120 to control the cooking temperature and the cooking time of the food product, as different types of food products typically require different cooking times and different cooking temperatures to achieve the desired degree of browning. For some vegetable types, e.g. broccoli, effective browning can be achieved at relatively low-temperatures, e.g. around 140° C., for others vegetable types, e.g. courgettes, a higher temperature, e.g. around 160° C., is require to achieve some browning of the food product. The controller 120 may be adapted to increase the cooking temperature of the food product by set intervals, e.g. 20° C. intervals, based on the user-specified degree of browning, whereas the lowest interval value, i.e. the lowest temperature at which the food product can be cooked, is defined by the user-specified food product type. For example, if the user selects broccoli as food product type, the cooking temperatures may be 140° C., 160° C. and 180° C. respectively for the browning levels "LIGHT", "MEDIUM" and "DARK", whereas if the user selects carrots as the food product type, the cooking temperatures may be 160° C., 180° C. and 200° C. respectively for the browning levels "LIGHT", "MEDIUM" and "DARK". In this manner, the cooking temperatures for the respective browning levels of different types of food product may be individually optimized. If the cooking appliance 100 is configured to cook vegetables, the controller 120 may be adapted to configure the cooking temperature in the cooking chamber 170 within a range of 140-200° C., although for different food types a broader temperature range such as a range of 120-240° C. may be more appropriate.

In order to accurately control the temperature in the cooking chamber 170 in accordance with the pre-set temperature corresponding to the user-specified preferences for cooking the food product in the cooking chamber 170, the cooking chamber 170 may comprise a temperature sensor 171 to which the controller 120 is responsive. The controller 120 may adjust operation of the heating stage 150 and/or of the humidity adjustment stage 160 in response to a sensor signal received from the temperature sensor 171 in a closed loop fashion, e.g. to reduce a discrepancy between the actual temperature in cooking chamber 170 as derived from the sensor signal by the controller 120 and the desired temperature in the cooking chamber 170 as specified by the parameterised pre-set algorithm. The controller 120 may be further adapted to control an air flow speed produced with the heating stage 150, e.g. to control the temperature in the cooking chamber 170, which may be in response to a temperature measured in the cooking chamber 170 with the temperature sensor 171.

In order to accurately control the humidity in the cooking chamber 170 in accordance with the pre-set humidity corresponding to the user-specified preferences for cooking the food product in the cooking chamber 170, the cooking chamber 170 may comprise a humidity sensor 173 to which the controller 120 is responsive. The controller 120 may adjust operation of the humidity adjustment stage 160 in response to a further sensor signal received from the humidity sensor 173 in a closed loop fashion, e.g. to reduce a discrepancy between the actual humidity in the cooking chamber 170 as derived from the further sensor signal by the controller 120 and the desired humidity in the cooking chamber 170 as specified by the parameterised pre-set algorithm.

Figure 3:
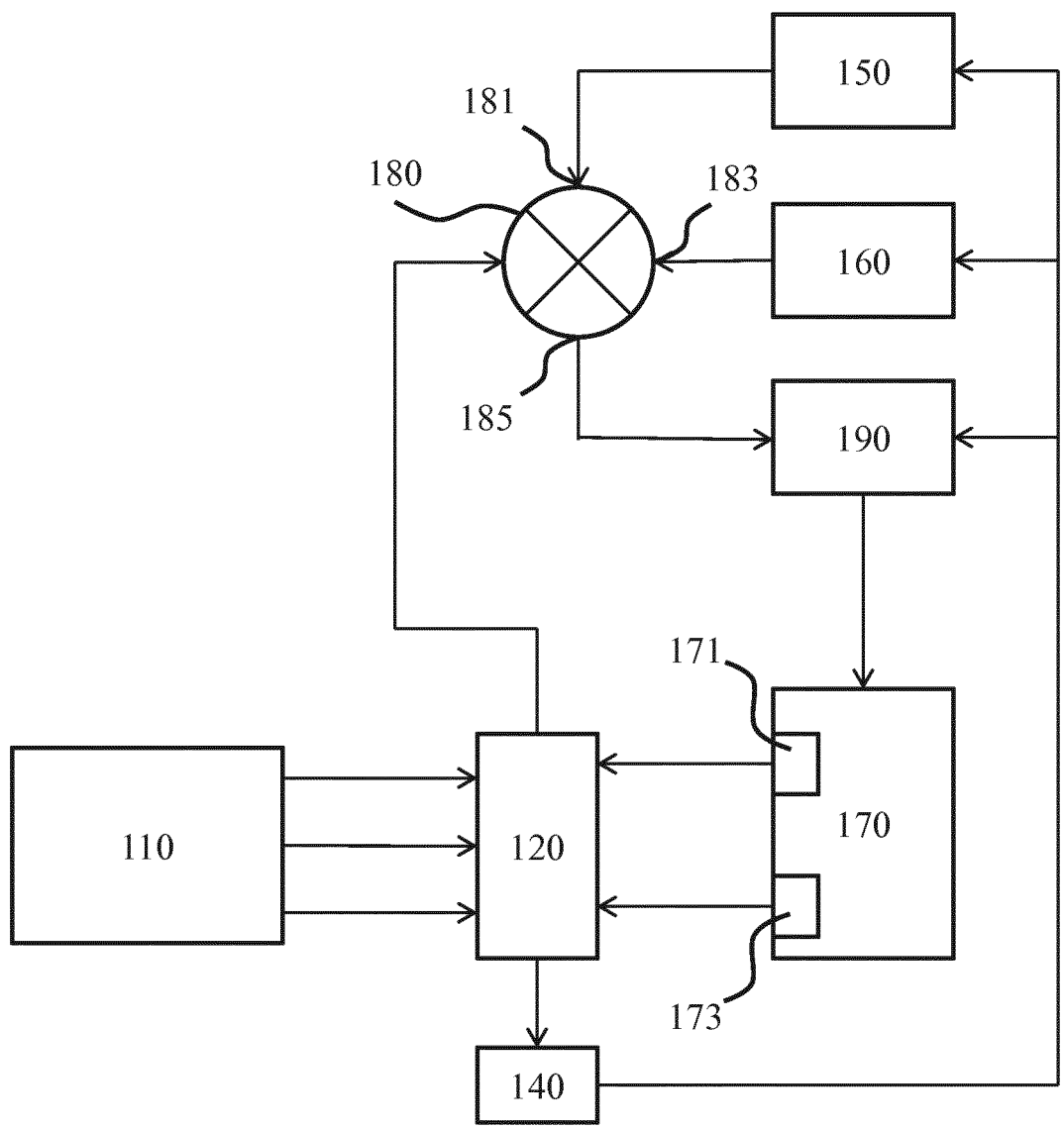

FIG. 3 schematically depicts an example embodiment of the cooking appliance 100 in which the cooking appliance comprises an oven. In this embodiment, the heating stage 150 is implemented as an air heater adapted to generate hot air for cooking the food product in the cooking chamber 170 and the humidity adjustment stage 160 is implemented as a steam generator adapted to generate steam for cooking the food product into cooking chamber 170.

The cooking appliance 100 further comprises a valve arrangement 180 under control of the controller 120. The valve arrangement 180 has a first inlet 181 coupled to the heating stage 150 and a second inlet 183 coupled to the humidity adjustment stage 160. An outlet 185 of the valve arrangement 180 is coupled to the cooking chamber 170. In an embodiment, the valve arrangement 180 may be arranged as a switch under control of the controller 120, such that the controller 120 can switch between the heating stage 150 and the humidity adjustment stage 160, i.e. can switch between dry heat and moist heat in accordance with the pre-set algorithm parameterized by the user inputs received from the user interface 110 as previously explained. The valve arrangement 180 optionally may be configured to change a mixing ratio between the dry heat from the heating stage 150 and the humid heat from the humidity adjustment stage 160 under control of the controller 120 in order to control the humidity in the cooking chamber 170 in a more fine-grained manner as previously explained.

The cooking appliance 100 may further comprise an additional heating stage 190 under control of the controller 120, e.g. through the timer 140 adapted to control at which point in time during the cooking process the additional heating stage 190 is switched on and further adapted to control the period of time during which the additional heating stage 190 is kept switched on. The additional heating stage 190 may be arranged to further heat the steam from the humidity adjustment stage 160 implemented as a steam generator in order to generate superheated steam. Superheated steam is characterized (amongst other characterizing features) by being able to be cooled without the steam condensing. Consequently, superheated steam may be used to achieve the desired temperatures in excess of 100° C. in the cooking chamber 170 without causing the steam to condense onto the surface of the food product being cooked in the later stages of the cooking process as previously explained, thereby protecting the texture of the external surfaces of the food product from becoming soggy by such condensation.

The additional heating stage 190 may be arranged between the humidity adjustment stage 160 and the valve arrangement 180 in case the additional heating stage 190 is arranged to only provide additional heating to the humid heat produced by the humidity adjustment stage 160. However, it should be understood that the additional heating stage 190 may be arranged in any suitable location, e.g. in between the valve arrangement 180 and the cooking chamber 170 as schematically depicted in FIG. 3 in order to facilitate the additional heating of both the dry heat produced by the heating stage 150 and the humid heat produced by the humidity adjustment stage 160.

As described in more detail with the aid of FIG. 1, the cooking chamber 170 may further comprise at least one of a temperature sensor 171 and a humidity sensor 173 in order to control the temperature and/or humidity in the cooking chamber 170 with the controller 120 in a closed loop fashion.

In the embodiments of the cooking appliance 100 of the present invention, the user interface 110 may be further adapted to allow a user to provide feedback regarding the cooking characteristics of the cooked food product, e.g. to flag a discrepancy between the user-specified food properties, in particular degree of browning and texture and the actual properties of the cooked food product. For example, the user may specify whether the food product was too browned or not browned enough, whether the food product was too crunchy or too soft, and so on. To this end, the user interface 110 may be configured in any suitable manner, e.g. using a dialogue screen or the like in case of the user interface 110 being implemented as a touchscreen, through which the user may provide such feedback.

The user feedback specified through user interface 110 is forwarded to the controller 120, which updates the pre-set algorithm in accordance with the user-specified feedback. For example, where for a particular type of food product the user specified that the food product was not browned enough, the controller may increase the temperature settings associated with the various browning levels of the food product in order to increase the degree of browning the next time the pre-set algorithm is used to cook that food product. Similarly, where for a particular type of food product the user specified that the food product was too browned, the controller may decrease the temperature settings associated with the various browning levels of the food product in order to decrease the degree of browning the next time the pre-set algorithm is used to cook that food product. In a similar fashion, the controller 120 may adjust the settings of the pre-set algorithm associated with the texture of such a food product, e.g. humidity settings such as the duration of the use of the heating stage 150 and the duration of the use of the humidity adjustment stage 160 during the cooking process of the food product in order to adjust the texture of the food product in accordance with the user-specified feedback the next time that food product is cooked in the cooking appliance 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A cooking appliance, comprising:
a cooking chamber;
a heating stage for heating a food product within the cooking chamber;
a humidity adjustment stage for adjusting humidity within the cooking chamber;
a user interface configured to allow a user to specify a texture of said food product and a degree of browning of said food product;
a controller responsive to the user interface and configured to control, the heating stage and the humidity adjustment stage, in accordance with an algorithm having the user-specified texture of said food product and the user-specified degree of browning of said food product as parameters; and
a valve arrangement responsive to the controller, the valve arrangement having a first inlet fluidly coupled to the heating stage, a second inlet fluidly coupled to the humidity adjustment stage, and an outlet fluidly coupled to the cooking chamber, wherein the valve arrangement is configured to change a mixing ratio between dry heat from the heating stage and humid heat from the humidity adjustment stage, and wherein the valve arrangement is arranged as a switch such that the controller switches between the heating stage and the humidity adjustment stage in accordance with the algorithm.

2. The cooking appliance of claim 1, wherein the user interface is configured to provide the user with a plurality of selection options for each of the texture of the food product and the degree of browning of the food product.

3. The cooking appliance of claim 1, wherein the user interface is further configured to allow the user to identify said food product, and wherein said algorithm has a user-specified food product identification as a further parameter.

4. The cooking appliance of claim 1, wherein the user interface is further configured to allow the user to provide feedback regarding a cooking result of said food product, and wherein the controller is further configured to adjust said algorithm in accordance with the user-provided feedback.

5. The cooking appliance of claim 1, further comprising a memory communicatively coupled to the controller, wherein the algorithm is stored in said memory.

6. The cooking appliance of claim 1, wherein the algorithm specifies an operating time of each of the heating stage and the humidity adjustment stage.

7. The cooking appliance of claim 1, further comprising a temperature sensor in the cooking chamber, wherein the controller is further configured to control at least one of the heating stage and the humidity adjustment stage in response to said temperature sensor.

8. The cooking appliance of claim 7, wherein the controller is configured to control at least one of the heating stage and the humidity adjustment stage based at least on a comparison between a temperature in the cooking chamber measured by the temperature sensor and a pre-determined temperature in the cooking chamber.

9. The cooking appliance of claim 1, further comprising a humidity sensor in the cooking chamber, wherein the controller is further configured to control the humidity adjustment stage in response to said humidity sensor.

10. The cooking appliance of claim 9, wherein the controller is configured to control the humidity adjustment stage based at least on a comparison between humidity in the cooking chamber measured by the humidity sensor and pre-determined humidity in the cooking chamber.

11. The cooking appliance of claim 1, wherein the heating stage comprises an air heater arranged to blow heated air into the cooking chamber, and wherein the humidity adjustment stage comprises a steam generator arranged to expel generated steam into the cooking chamber.

12. The cooking appliance of claim 11, further comprising an additional heating stage responsive to the controller and coupled between the steam generator and the cooking chamber for superheating the steam generated by the steam generator.

13. The cooking appliance of claim 12, wherein the superheating of the generated steam is based on the user-specified texture of said food product and the user-specified degree of browning of said food product.

14. The cooking appliance of claim 11, wherein the controller is further configured to control a speed at which the air heater blows the heated air into the cooking chamber.

15. The cooking appliance of claim 1, wherein the controller is further configured to control a temperature in the cooking chamber such that the temperature is in a range of 120-240° C.

16. The cooking appliance of claim 1, wherein the cooking appliance comprises an oven.

17. The cooking appliance of claim 1, wherein the controller is further configured to control a temperature in the cooking chamber such that the temperature is in a range of 140-200° C.

18. The cooking appliance of claim 1, wherein the controller is further configured to control superheating of a mixture of the dry heat from the heating stage and the humid heat from the humidity adjustment stage.

* * * * *